United States Patent [19]

Baskent et al.

[11] 4,299,923

[45] Nov. 10, 1981

[54] ALKYL-MODIFIED SILOXANE COPOLYMERS USEFUL AS FOAM STABILIZERS IN HIGH RESILIENCE POLYURETHANE FOAM

[75] Inventors: Feyyaz O. Baskent, Mahopac, N.Y.; James D. Reedy, New Fairfield, Conn.

[73] Assignee: Union Carbide Corporation, New York, N.Y.

[21] Appl. No.: 134,637

[22] Filed: Mar. 27, 1980

[51] Int. Cl.$^3$ ............... C08G 18/14; C08G 18/63; C08G 18/24

[52] U.S. Cl. .................... 521/110; 521/127; 521/129; 521/904; 521/137; 528/503; 556/456

[58] Field of Search ............... 521/110; 556/456

[56] References Cited

U.S. PATENT DOCUMENTS

| | | | |
|---|---|---|---|
| 2,901,445 | 8/1959 | Harris | 521/110 |
| 3,741,917 | 6/1973 | Morehouse | 260/2.5 AH |
| 3,839,384 | 10/1974 | Morehouse | 260/448.2 R |
| 3,884,847 | 5/1975 | Pruvost et al. | 521/110 |
| 3,905,924 | 9/1975 | Prokai | 260/2.5 AH |
| 3,935,133 | 1/1976 | Van Leeuwen | 260/2.5 AH |
| 4,042,540 | 8/1977 | Lammerting et al. | 260/2.5 AH |

FOREIGN PATENT DOCUMENTS

| | | | |
|---|---|---|---|
| 535555 | 1/1957 | Belgium | 521/110 |
| 907230 | 10/1962 | United Kingdom | 521/110 |
| 908012 | 10/1962 | United Kingdom | 521/110 |

OTHER PUBLICATIONS

Condensed Chemical Dictionary, 5th Edition Reinhold N.Y., (1956), p. 881..

Eaborn-Organesilicon Compounds, Academic Press, N.Y., (1960), pp. 246-250, 277-279 and 454-466.

*Primary Examiner*—H. S. Cockeram
*Attorney, Agent, or Firm*—Andrea L. Loshin

[57] ABSTRACT

Organosiloxane copolymers containing alkyl groups having from 5 to 20 carbon atoms that have beneficial utility as foam stabilizers in the manufacture of low density high resilience polyurethane foam; solutions of such copolymers; a process for producing low density high resilience polyurethane foam utilizing as a foam stabilizer said organosiloxane copolymers; and the foams derived therefrom.

19 Claims, No Drawings

ALKYL-MODIFIED SILOXANE COPOLYMERS USEFUL AS FOAM STABILIZERS IN HIGH RESILIENCE POLYURETHANE FOAM

FIELD OF THE INVENTION

This invention relates to novel organosiloxane copolymers having beneficial utility as foam stabilizers in the manufacture of high resilience polyurethane foam.

BACKGROUND OF THE INVENTION

Basically high resilience polyurethane foams are produced by the reaction of highly primary hydroxyl-capped, high molecular weight polyols with organic isocyanates and water. High resilience polyurethane foams are distinguishable, in part, from conventional hot cure polyurethane foams by the use of such polyols and the fact that high resilience polyurethane foams require little or no oven curing and thus are often referred to as cold cure foams. Such foams are extremely desirable for cushioning applications because of their excellent physical properties, e.g., very high foam resilience, low flammability, open-celled structure, low flex fatigue (long life) and high SAC factors (load bearing properties).

Because of the high reactivity of high resilience foam ingredients and their rapid buildup of gel strength, sometimes the foam can be obtained without a cell stabilizer. However such foams typically have very irregular cell structure as particularly evidenced by surface voids and the lack of discovery of a proper agent to help control cell structure has been a major problem in the art.

Attempts to solve this problem with surfactants generally employed in the stabilization of hot cure polyurethane foam have not proven satisfactory because such surfactants tend to overstabilize, causing extremely tight, shrinking foam. Nor is the problem corrected by reducing the concentrations of such surfactants, since at concentrations required to eliminate shrinkage, the cells are no longer stabilized satisfactorily and the foam structure becomes irregular, coarse and contains surface voids.

U.S. Pat. No. 4,042,540 discloses that a variety of low viscosity siloxanes, including low viscosity dimethylsilicone oils, are better stabilizers for high resilience polyurethane foams than high viscosity dimethylsilicone oils. The use of low viscosity dimethylsilicone oils alone as stabilizers for high resilience foams also has various disadvantages. For example, at low concentrations they create metering and pumping problems in the processing of the foam, while at higher concentrations these oils adversely affect the physical properties of the foams. Such metering and pumping problems might be solved by using a low concentration of the silicone dissolved in a solvent. However, solvents for such dimethylsiloxane oils that are nonreactive with the foam ingredients e.g. alkanes, hexamethyldisiloxane, and the like, can adversely affect the foam's physical properties in proportion to their concentration and generally create flammability hazards. Furthermore, isocyanate reactive diluents, such as polyether triols and the like which do not significantly change the foam's properties, inasmuch as they react into the system and become part of the foam structure, are not satisfactory solvents for dimethylsilicone oils, since not enough oil can be dissolved to provide foam stabilization at practical solution concentrations. High resilience foams are also adversely affected by dimethylsilicones having more than about 10 dimethylsiloxy units per siloxane. For example only five or ten weight percent of such species in a dimethylsilixone oil can appreciably degrade the foam's physical properties and even cause foam shrinkage.

Several other patents disclose organosiloxane copolymers and their use as foam stabilizers in high resilience foam formulation. U.S. Pat. No. 3,905,924 relates to the use of cyanoalkylsiloxane copolymers as stabilizers for high resilience polyurethane foam. U.S. Pat. No. 3,741,917 describes siloxane-oxyalkylene copolymers and the use of said organosiloxane copolymers in the formulation of high resilience polyurethane foam. U.S. Pat. No. 3,935,133 teaches the use of high molecular weight silicate esters of polyether alcohols to stabilize high resilience polyurethane foam. U.S. Patent Application Ser. No. 932,637, filed Aug. 10, 1978 U.S. Pat. No. 4,210,726, discloses a process for producing high resilience polyurethane foam utilizing as a foam stabilizer a combination of an organosiloxane copolymer and a hydrocarbon oil. However, none of the above mentioned patents or applications disclose the novel alkyl-modified siloxane copolymers of this invention or their unexpectedly beneficial utility as foam stabilizers in the manufacture of low density high resilience polyurethane foam.

Within the past few years, cushions fabricated from high resilience polyurethane foam have gained increasingly wide acceptance in automotive seatings. Automotive industry requirements decreased the foam density needed for seat cushions, thus increasing the difficulty of stabilization of high resilience polyurethane foam. Recently new systems with high water levels have been proposed which can produce foam cushions with densities of 1.50 to 1.75 lbs./cubic foot and acceptable physical properties in comparison to the commercial foaming systems. However, without any foam stabilizing surfactant, the new high water systems produced foams with large and irregular cells or caused collapse of the foam. The addition of commercial high resilience polyurethane foam surfactants (including the low viscosity dimethyldilicone oils, cyanoalkylsiloxane copolymers and siloxane-oxyalkylene copolymers disclosed in the above-mentioned patents) to this new high water system did not correct these problems. The commercial high resilience polyurethanes foam surfactants caused collapse of the foams, and commercial flexible "hot-cure" polyurethane surfactants caused severe shrinkage and pneumatic foams. Thus, it remains a problem in low density high resilience polyurethane foam formulations to obtain a surfactant which has a proper degree of cell stabilizing ability.

SUMMARY OF THE INVENTION

This invention is based, in part, on the discovery that certain low molecular weight organosiloxane copolymer surfactants can be used to control the cell uniformity of low density high resilience polyurethane foam with little, if any, foam shrinkage. Moreover, voids in the foam are eliminated (or at least greatly reduced) by the instant invention and the cell structure of the low density high resilience polyurethane foam is also much more uniform and finer than where no surfactant agent is used. The present invention provides two types of low molecular weight alkyl-modified methylsiloxane copolymers in which the alkyl-modifying group contains from five to twenty carbon atoms, which unexpectedly produce low density high resilience polyurethane foams with excellent cell structure in comparison to current high resilience polyurethane foam surfactants.

The novel organosiloxane copolymers are selected from the group consisting of: (a) an organosiloxane copolymer having the average formula:

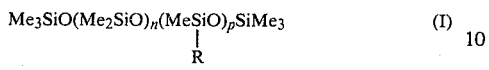
(I)

wherein: Me is a methyl group, R is an alkyl group having from five to twenty carbon atoms inclusive, n has an average value from one to four inclusive, p has an average value from one to two inclusive, and the ratio of n to p has a value from one to three inclusive; and (b) an organosiloxane copolymer having the average formula:

$$R'Me_2SiO(Me_2SiO)_nSiMe_2R' \qquad (II)$$

wherein: Me is a methyl group, R' is an alkyl group having from five to twenty carbon atoms inclusive, and n has an average value from 0 to 8 inclusive (preferably from 1 to 5 inclusive) with the proviso that the R' groups represent from 20 to 45 inclusive (preferably from 25 to 40 inclusive) weight percent of the organosiloxane copolymer. Illustrative of the groups represented by R in Formula I and by R' in Formula II are pentyl, hexyl, heptyl, octyl, nonyl, decyl, and the like. R' may either be the same or different alkyl group in Formula II. Preferably R and R' have from 5 to 12 carbon atoms inclusive.

The present invention also relates to the use of the alkyl-modified methylsiloxane copolymers of the present invention as cell stabiizers in the preparation of low density high resilience polyurethane foam. More specifically the instant invention is directed, in part, to a process for preparing high resilience polyurethane foam having a density of no greater than 2.0 pounds per cubic foot (preferably no greater than 1.75 pounds per cubic foot), said process comprising foaming and reacting a reaction mixture comprising: (a) an organic polyol selected from the group consisting of (i) a polyether triol containing at least 40 mole percent primary hydroxyl groups and having a molecular weight from about 2000 to about 8000 and (ii) a mixture of said polyether triol and other polyethers having an average of at least two hydroxyl groups, said polyether triol of said mixture amounting to at least 40 weight percent of the total polyol content; (b) a polyisocyanate, said organic polyol and said polyisocyanate being present in the mixture in a major amount and in the relative amount required to produce the polyurethane foam; (c) a blowing agent in a minor amount sufficient to foam the reaction mixture; (d) a catalytic amount of catalysts for the production of polyurethane foam; (e) a minor amount of the organosiloxane copolymer of the present invention: and, optionally, (f) a flame retardant in a minor amount sufficient to retard the flammability of the polyurethane foam. Low density high resilience polyurethane foams obtained according to the process of this invention have uniform cell structure and a smooth molding surface. In addition, the alkyl-modified siloxane copolymers according to the invention are operable over a broad range (e.g. 0.02 to 5.0 parts by weight per hundred parts by weight of the polyether polyol) and can be used in solution and consequently are easy to meter and pump during foam formulation.

DESCRIPTION OF PREFERRED EMBODIMENTS

The novel organosiloxane copolymers of the present invention can be prepared by several methods. A preferred method involves the preparation of a mixture consisting of an alkene having from five to twenty carbon atoms and a hydrosiloxane fluid selected from the group consisting of:

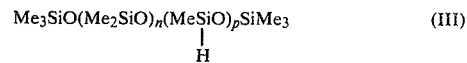
(III)

wherein Me, n, p and the ratio of n to p are as defined for Formula (I) above; and $$HMe_2SiO(Me_2SiO)_nSiMe_2H \qquad (IV)$$

ps wherein Me and n are as defined for Formula (II) above. This mixture is heated to a temperature from about 75° C. to about 85° C. in a 500 ml reaction flask equipped with a mechanical stirrer, condenser, and temperature controller. A platinum catalyst is added to the mixture at this temperature and an exothermic reaction is observed. Chloroplatinic acid is particularly effective; however, other platinum derivatives well known in art may also be used. The catalyst is conveniently added as a solution, for example, in tetrahydrofuran, ethanol, butanol, or mixed solvents such as isopropanol/1,2-dimethoxyethane. A preferred concentration of catalyst based on total weight of the hydrosiloxane fluid and alkene reactants is that which provides from five to fifty parts per million of platinum, although higher and lower concentrations may be used. A solvent may also be used for the reactions of this invention. Those solvents which are reactive with the Si-H group of the hydrosiloxane fluid under the conditions of this invention should not be employed. Methanol, ethanol, propanol, and ether alcohols are in this class. Hydrocarbon solvents such as benzene, toluene, and xylene are useful solvents for the reaction. Ethers are another useful class of solvents. The temperature range for the reaction of this invention is from about 60° C. to about 138° C. Lower temperatures may be used but the reaction times are slower. Higher temperatures may also be used up to 200° C. but there is no advantage to such high temperatures. The choice of solvent should, of course, be adapted to the preferred temperature range. The removal or neutralization of chloroplatinic acid catalyst is desirable for long-range product stability. Usually sodium bicarbonate (NaHCO₃) is added to the reaction mixture to effect neutralization, and the resultant product is then pressure filtered. The product so produced is an organosiloxane copolymer of this invention represented by Formula I or II above.

Another method for preparation of the novel organosiloxane copolymers of this invention involves the conventional equilibration. By way of illustration, an alkylmethylsiloxane can be equilibrated with methylsiloxane using either acid or base catalysts as follows:

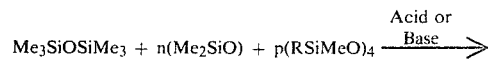

-continued

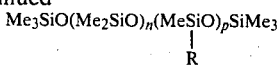

wherein Me, R, n, p and the ratio of n to p are as defined for Formula (I) above. The conventional acid catalyzed equilibration used for standard dimethylsiloxane intermediates in which sulfuric acid ($H_2SO_4$) is a catalyst may be applied. An anhydrous trifluoromethyl sulfonic acid catalyst in concentration from about 0.1 to about 0.5 weight percent may also be used successfully. The equilibration may be run from about 25° C. to about 50° C. with vigorous stirring at least until the mixture has become stable.

The relative amount of organosiloxane copolymers of this invention used to make the polyurethane foam can vary over wide ranges and are generally employed in amounts ranging from about 0.2 to about 5 parts by weight or greater per hundred parts by weight of the organic polyol starting material. Generally there is no commensurate advantage to using amounts of copolymer greater than about five parts by weight, while the use of amounts below 0.02 parts by weight can detract from stability against foam shrinkage. Preferably the organosiloxane copolymers are employed in amounts ranging from 0.2 to about 2.0 parts by weight per hundred parts by weight of the organic polyol starting material.

The polyhydroxyl reactants (organic polyols) employed in this invention as the starting materials to prepare the polyurethane foams can be any polyether triol containing at least 40 mole percent of primary hydroxyl groups and having a molecular weight from about 2,000 to about 8,000. Conversely said polyether triols can contain no more than 60 mole percent of secondary hydroxyl groups. Preferably said polyether triols contain about 55 to 90 mole percent of primary hydroxyl groups and have a molecular weight from about 4,000 to about 7,000. The preferred polyether triols used in this invention are polyalkylenether triols obtained by the chemical addition of alkylene oxides to trihydroxyl organic containing materials, such as glycerol; 1,2,6-hexanetriol; 1,1,1-trimethylolethane; 1,1,1-trimethylolpropane; and the like, as well as mixtures thereof. The alkylene oxides employed in producing the preferred polyethers described above normally have from 2 to 4 carbon atoms, inclusive while propylene oxide and mixtures of propylene oxide and ethylene oxide are especially preferred.

The organic polyol starting materials used in this invention can be mixtures consisting essentially of said above defined polyether triols and other polyether polyols having an average of at least two hydroxyl groups, said above defined polyether triols amounting to at least 40, preferably at least 50, weight percent of the total polyol content of the mixtures. Illustrative of such other polyethers are triols outside of the scope defined above, diols, tetraols and polymer/polyols, and the like, as well as mixtures thereof. Examples of such polyether polyols that can be mixed with the above defined polyether triols include those adducts of alkylene oxide to such polyols as diethylene glycol; dipropylene glycol; pentaerythritol; sorbitol; sucrose; lactose; alpha-methylglucoside; alpha-hydroxyalkyglucoside; novolac resins; water; ethylene glycol; propylene glycol; trimethylene glycol; 1,2-butylene glycol; 1,3-butanediol; 1,4-butanediol; 1,5-pentanediol; 1,2-hexane glycol; 1,10-decanediol; 1,2-cyclohexanediol; 2-butene-1,4-diol; 3-cyclohexane-1,1-dimethanol; 4-methyl-3-cyclohexene-1,1-dimethanol; 3-methylene-1,5-pentanediol; 4-(2-hydroxyethoxy)-1-butanol; and the like; as well as mixtures thereof.

Another type of polyether polyol that can be mixed with the above defined polyether triols and used as the starting materials in this invention are graft polymer/polyether compositions obtained by polymerizing ethylenically unsaturated monomers in a polyether as described in British Pat. No. 1,063,222 and U.S. Pat. No. 3,383,351. Suitable monomers for producing such compositions include, for example, acrylonitrile, vinyl chloride, styrene, butadiene, vinylidene chloride, and the like. Suitable polymers for producing such compositions include, for example, those polyethers hereinabove-described. These graft copolymer/polyether compositions can contain from about 1 to about 70 weight percent, preferably about 5 to about 50 weight percent and most preferably about 10 to about 40 weight percent of the unsaturated monomer polymerized in the polyether. Such compositions are conveniently prepared by polymerizing the monomers in the selected polyether at a temperature of 40° to 150° C. in the presence of a free radical polymerization catalyst, such as peroxides, persulfates, percarbonates, perborate and azo compounds as more fully described by the above patent references. The resulting compositions may contain a small amount of unreacted polyether, monomer and free polymer as well as the graft polymer/polyether complex. Especially preferred are the graft polymer/polyethers obtained from mixtures of acrylonitrile and styrene and polyether triols.

The particular organic polyol or polyols employed as the starting materials of this invention merely depend on the end use of the cold cure polyether urethane foam. For instance, the employment of polyether triols having at least 40 mole percent primary hydroxyl groups and molecular weights from 2,000 to 8,000 preferably 4,000 to 7,000 generally have hydroxyl numbers from 84 to 21, preferably 42 to 20 and give primarily flexible polyether foams. The supplementary polyethers which may have any proportion of primary to secondary hydroxyl groups and which may be mixed with the required polyether triols can be used to control the degree of softness of the foam or vary the load bearing properties of the foam. Such limits are not intended to be restrictive, but are merely illustrative of the large number of possible combinations of polyether triols and other polyethers that can be employed.

The hydroxyl number is defined as the number of milligrams of potassium hydroxide required for the complete neutralization of the hydrolysis product of the fully acetylated derivative prepared from one gram of polyol or mixtures of polyols with or without other crosslinking additives used in the invention. The hydroxyl number can also be defined by the equation:

$$OH = \frac{56.1 \times 1000 \times f}{M.W.}$$

wherein OH is the hydroxyl number of the polyol, f is its functionality and m.w. is its molecular weight.

A variety of organic isocyanates can be employed in the foam formulations of this invention for reaction with the organic polyol starting materials above described to provide cold cure polyether urethane foams.

Preferred isocyanates are polyisocyanates and polyisothiocyanates of the general formula:

$$Q(NCY)_i$$

wherein Y is oxygen, i is an integer of two or more and Q is an organic radical having the valence of i. For instance, Q can be a substituted or unsubstituted hydrocarbon radical, such as alkylene and arylene, having one or more aryl-NCY bonds and/or one or more alkyl-NCY bonds. Q can also include radicals such as —Q-ZO—, where Q is an alkylene or arylene group and Z is a divalent moiety such as CO, $SO_2$ and the like. Examples of such compounds include hexamethyl diisocyanate, 1,8-diisocyanato-p-methane, xylylene diisocyanates, $(OCNCH_2CH_2CH_2—OCH_2)_2O$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4'-4''-triisocyanate, and isopropylbenzene-alpha-4-diisocyanate. Further included among the isocyanates useful in this invention are dimers and trimers of isocyanates and diisocyanates and polymeric diisocyanates such as those having the general formula:

$$Q(NCY)_i \text{ and } [Q(NCY)_i]_j$$

in which i and j are integers of two or more, and/or (as additional components in the reaction mixtures) compounds of the general formula:

$$L(NCO)_i$$

in which is one or more and L is a monofunctional or polyfunctional atom or radical. More specifically, the polyisocyanate component employed in the polyurethane foams of this invention also include the following specific compounds as well as mixtures of two or more of them: 2,4-tolylene diisocyanate, 2,6-tolylene diisocyanate, crude tolylene diisocyanate, bis(4-isocyanatophenyl)methane, polymethylene polyphenylisocyanates that are produced by phosgenation of anilineformaldehyde condensation products, 2,4,6-toluenetriisocyanate, and many other organic polyisocyanates that are known in the art, such as those that are disclosed in an article by Siefken, Ann., 565, 75 (1949). In general, the aromatic polyisocyanates are preferred.

Particularly useful isocyanate components of high resilience cold cure formulations within the scope of this invention are combinations of isomeric tolylene diisocyanates and polymeric isocyanates having units of the formula

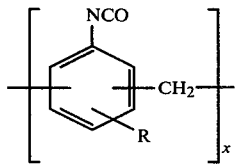

wherein R is hydrogen and/or lower alkyl and x has a value of at least 2.1. Preferably the lower alkyl radical is methyl and x has a value of from 2.1 to about 3.0.

The amount of polyisocyanate employed will vary slightly depending on the nature of the polyurethane being prepared. In general the polyisocyanates are employed in the foam formulations of this invention in amounts that provide from 80 to 150 percent, preferably from 90 to 110 percent of the stoichiometric amount of the isocyanato groups required to react with all of the hydroxyl groups of the organic polyol starting materials and with any water present as a blowing agent. Most preferably, a slight amount of isocyanato groups in excess to the stoichiometric amount is employed.

The blowing agents which can be employed in the process of this invention include water, liquefied gases which have boiling points below 80° F. and above −60° F., or other inert gases such as nitrogen, carbon dioxide, helium and argon. Suitable liquefied gases include saturated aliphatic fluorohydrocarbons which vaporize at or below the temperature of the foaming mass. Such gases are at least partially fluorinated and can also be otherwise halogenated. Fluorocarbon blowing agents suitable for use in foaming the formulations of this invention include trichlorofluoromethane, dichlorodifluoromethane, dichlorofluoromethane, 1,1-chloro-1-fluoroethane, 1-chloro-1,1-difluoro, 2,2-dichloroethane, and 1,1,1-trifluoro-2-chloro-2-fluoro-3,3-difluoro-4,4,4-trifluorobutane. The preferred blowing agent for the process of this invention is trichlorofluoromethane. The amount of blowing agent used will vary with density desired in the foamed product. Usually from 2 to 20 parts by weight of the blowing agent per 100 parts by weight of the organic polyol starting materials are preferred.

The catalysts employed in this invention to produce polyurethanes include any of the amines or metal catalysts used in producing conventional flexible and high resilience polyurethane foam. Illustrative of such conventional amine catalysts are N-methyl morpholine, N-ethyl morpholine, hexadecyl dimethylamine, triethylamine, N,N,N',N'-tetramethyl-1,3-butanediamine, N,N-dimethylethanolamine, diethanolamine, 3-dimethylamino-N,N-dimethylpropionamide, bis(2-dimethylaminoethyl)ether, N,N,N',N'-tetramethyl ethylenediamine, 4,4'-methylene bis(2-chloroaniline), dimethyl benzylamine, N-coco morpholine, triethylene diamine, [1,4-dizabicyclo(2,2,2)-octane], the formate salts of triethylene diamine, other salts of triethylene diamine and oxyalkylene adducts of primary and secondary amino groups, and the like. Illustrative of such conventional metal catalysts are the tin salts of various carboxylic acids and nickel acetylacetonates. The preferred metal catalyst for the process of this invention is dibutyltindilaurate. Such amine and metal catalysts are preferably employed in the mixtures in an amount from 0.1 to 2 weight percent based on the total weight of the organic polyol starting material.

Other additional ingredients can be employed in minor amounts in producing the high resilience polyurethane foams in accordance with the process of this invention, if desired, for specific purposes. Thus, flame retardants (e.g. trichloroethylphosphite) can be used to reduce any tendency of the polyurethane foam to flammability. Of course any suitable organic solvent for the catalysts can be used which does not substantially adversely affect the operation of the process or reactants. Examples of such solvents for the catalysts include polyols (e.g. 2-methyl-2,4-pentanediol), dipropylene glycol and the like.

In accordance with this invention, the high resilience polyurethane foams can be produced by any suitable technique. The preferred process is a one-step or one shot technique wherein all of the reactants are reacted simultaneously with the foaming operation. A second general process is called the prepolymer process whereby a prepolymer is formed by reacting the polyether starting material with a small excess of the isocyanate and later foaming the prepolymer by the reaction with water or an inert blowing agent. Another method which can be used is the quasi-prepolymer technique which involves reacting a large excess of the isocyanate with the polyether product with additional polyether in the presence of a blowing agent. Sometimes it is preferred to premix the polyether starting material and organosiloxane copolymer although any suitable premixture of the various ingredients can be used. Because of the high exothermic nature of the reaction high resilience polyurethane foams are rapidly produced without the need of any external heat by mixing the reactants at ambient temperatures and pouring the foaming reaction mixture into a suitable mold and allowing the foam to cure itself. Of course, if desired the overall reaction can be even further accelerated by preheating the mold and/or employing conventional high temperature post curing procedures. Within a shorter period of time the cold cure process, with or without post cure, simultaneously achieves a greater degree of cure throughout the entire foam, and shorter tack free and demolding time than is generally achieved with conventional hot cure processes. For instance, high resilience polyurethane foams produced by the cold cure process can be removed from the mold far sooner without substantial damage to the surface than conventional hot cure polyurethane foams. Of course it is to be understood that the cold cure polyurethane foams of this invention can also be prepared in slabstock form, if desired.

An additional feature of the instant invention are the novel compositions suitable for use in producing the high resilience polyether urethane foam. For example it may be desirable, particularly on a commercial scale to employ the novel organosiloxane copolymer in a diluted form, i.e. in the form of a organosiloxane copolymer-solvent solution premix or a organosiloxane copolymer-solvent-catalyst solution premix. Such solution premixes can help serve to eliminate any mixing, metering, or settling problems. Moreover, fewer streams of ingredients may be needed at the mixing head of the operational apparatus. Of considerable importance is that the formulator has the latitude to select the particular solvent which best suits the system and minimize or eliminate any loss of foam properties. Organosiloxane copolymer-solvent-catalyst premixes can also be used since the selected solvent can be one which serves the dual role of solvent for the catalysts as well as the organosiloxane copolymer. This operation of formulating a premix simplifies the foaming operation and improves the precision of metering ingredients. While any suitable organic solvent such as hydrocarbon, halohydrocarbons, organic hydroxyl compounds, alkyl phthalates, and the like may be employed, preferably when employed the solvent selected should be one in which the organosiloxane copolymer is substantially soluble. For example, it is preferred that at least five parts by weight of the organosiloxane copolymer be soluble in 95 parts by weight of the solvent. More preferably the minimum percentage of organosiloxane copolyer in the organosiloxane copolymer-solvent or organosiloxane copolymer-solvent-catalyst solutions should be in the range of at least about ten to at least about 30 weight percent. Of course it is understood that such solvents need not be employed and that the maximum percentage of organosiloxane copolymer in said solvent solutions is not critical. Moreover, when employed such solvent solutions should of course be correlated to the amounts of active organosiloxane copolymer that may be employed per hundred parts by weight of the organic polyol starting material as outlined above. The same correlation should also be made with regard to catalyst when an organosiloxane copolymer-solvent-catalyst solution is employed. Preferably the solvent for the organosiloxane copolymer is an organic hydroxyl compound such as hydroxyl terminated organic ether compounds. More preferably they are polyether triols, diols, and mono-ols such as the adducts of ethylene oxide, propylene oxide, butylene oxide, with starters such as glycerol, water, trimethylolpropane, 1,2,6-hexanetriol, ethylene glycol, butanol, nonylphenol, and the like. Of course the oxyalkylene units of such adducts may be of different types, e.g. oxypropylene and oxyethylene groups, and may be randomly distributed or in blocks. The most preferred solvents are the polyether triols having all or predominantly oxypropylene units in the oxyalkylene portion and having molecular weights in the range from about 2,000 to 6,000 inasmuch as they may be the same as or similar to the primary triols employed as the organic polyol starting material of the foam formulation. Moreover this discovery concerning the solubility of the organosiloxane copolymers of this invention can be regulated and controlled.

The high resilience polyurethane foams produced in accordance with this invention can be used for the same purposes as corresponding conventional foams, e.g. they can be used wherever cushioning is desired, e.g. in furniture; in transportation systems, automobiles, planes, etc.; in carpeting; in the packaging of delicate objects; and the like.

The following examples are merely illustrative of the present invention and are not intended as a limitation upon the scope thereof.

| Abbreviations In the examples, the following abbreviations are used: | |
|---|---|
| in. | inch |
| lb. | pound |
| RPM | revolutions per minute |
| PHPP | parts per hundred parts polyol on a weight basis |
| °C. | degree centigrade |
| ml | milliliter |
| cstk | centistroke |
| cc | cubic centimeter |
| min. | minute |
| ft. | feet |
| sec. | seconds |
| percent | weight percent |
| Me | Methyl |
| R | Alkyl group from 5 to 20 carbon atoms |
| ppm | parts per million parts on a weight basis |
| VAZO | Azobisisobutyronitrile |

Starting Materials

In the following examples, the starting materials described below were used:

a. Polyols

Polyol I. A polyether polyol produced by polymerizing propylene oxide and then ethylene oxide using glycerol as a starter. This polyether polyol has an approximate molecular weight of 4500 and a hydroxyl number of approximately 34. It contains about 85.5 percent by weight propylene oxide, 14.5 percent by weight ethylene oxide and about 73 percent primary hydroxyl groups.

Polyol II. A polyether polyol produced by polymerizing propylene oxide and then ethylene oxide using glycerol as a starter. This polyether polyol has an approximate molecular weight of 4500 and a hydroxyl number of approximately 34. It contains about 85.5 percent by weight propylene oxide, 14.5 percent by weight ethylene oxide and about 80 percent primary hydroxyl groups.

Polymer/Polyol I. A polymer/polyol prepared by polymerizing styrene/acrylonitrile in Polyol I using VAZO as a catalyst. This polymer/polyol has a hydroxyl number of approximately 28. The polymer contains a one to one weight ratio of styrene to acrylonitrile and comprises 21 percent by weight of the total weight of the polymer/polyol.

b. Isocyanates

Isocyanate I. This is a mixture of about 80 weight percent 2,4-tolylene diisocyanate and about 20 weight percent 2,6-tolylene diisocyanate.

Isocyanate II. This is a composition consisting of about 80 weight percent Isocyanate I and about 20 weight percent of a polymethylene polypheneylene isocyanate polymer containing about 2.5 to 2.9 moles of NCO per mole of polymer and having an isocyanate content of about 31.4 percent by weight.

c. Polyurethane Foam Catalysts

Catalyst I. This is a composition consisting of about 70 percent by weight bis-(N,N-dimethylaminoethyl)-ether and about 30 percent by weight dipropylene glycol solvent.

Catalyst II. Bis-(N,N-dimethylaminoethyl)-ether

Catalyst III. This is a composition consisting of about 33 percent by weight triethylenediamine and about 67 percent by weight dipropylene glycol solvent.

Catalyst IV. This is a composition consisting of about 33.3 percent by weight 3-dimethylamino-N,N-dimethyl-propionamide and 66.6 percent by weight ethoxylated phenol solvent.

Catalyst V. This is a composition consisting of about 88 percent by weight dibutyltindilaurate and about 12 percent by weight polyoxypropylene triol having a molecular weight of about 3000 and a hydroxyl number of about 56.

Catalyst VI. Diethanolamine d. Organosiloxane Copolymer Surfactants

Organosiloxane Copolymers A through V of this invention and Organosiloxane Copolymers AA and BB outside the scope of this invention are described in Examples I through XXXV below.

e. Blowing Agent

Blowing Agent I. Trichlorofluoromethane.

f. Flame Retardant

Flame Retardant I. Trichloroethylphosphite.

g. SiH Addition Catalyst

Chloroplatinic Acid Solution. A solution consisting of 4.4 percent by weight of chloroplatinic acid hexahydrate dissolved in 95.6 percent by weight of a solvent consisting of 99.0 percent by weight of 1,2-dimethoxyethane and 1.0 percent by weight of isopropanol. This solution was used in an amount that provided 50 parts by weight of platinum per million parts by weight of the hydrosiloxane fluid and alkene reactants.

EXAMPLE I

Part A: Preparation of Hydrosiloxane Fluid

Into a 500 ml three-necked reaction flask equipped with a mechanical stirrer was added a mixture comprised of 42.17 grams (0.26 mole) of hexamethyldisiloxane (Me₃SiOSiMe₃), 37.42 grams (0.126 mole) of cyclic dimethylsiloxane tetramer (Me₂SiO)₄, and 19.17 grams of a poly(methylhydrogensiloxane) containing about 0.32 equivalents of (MeHSiO). Also added to the reaction flask was about 2.0 grams (0.02 mole) of sulfuric acid (H₂SO₄) catalyst corresponding to about two weight percent of the total weight of the mixture. The mixture was stirred at room temperature for about four hours resulting in an equilibrated liquid product. The equilibrated liquid product was neutralized with four weight percent sodium bicarbonate (NaHCO₃) and then filtered through a pressure filter containing an average filter size of about 0.02 microns. The equilibrated liquid product, now properly designated a hydrosiloxane fluid, is a clear liquid with a viscosity of 1.86 cstk at a temperature of 25° C. The Si-H content of the hydrosiloxane fluid as determined by alkaline hydrolysis is 71.7 cc H₂ per gram of hydrosiloxane fluid and the calculated molecular weight is 375. The hydrosiloxane fluid, hereinafter referred to as Hydrosiloxane Fluid I, has the average composition:

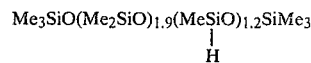

The composition and properties of the hydrosiloxane fluids used in the examples are tabulated in Table I below.

Part B: Preparation of Novel Organosiloxane Copolymer

Into a 500 ml three-necked reaction flask equipped with a mechanical stirrer, condenser and temperaure controller was added 31.0 grams (0.08 mole) of Hydrosiloxane Fluid I. The Hydrosiloxane Fluid I was then heated to 85° C. and chloroplatinic acid solution was added to the reaction flask. To the reaction flask was also added dropwise 13.6 grams (0.12 mole) of 1-octene in 20 percent excess concentration. The reaction flask temperature reached a maximum 132° C. due to an exothermic reaction. The exothermic reaction was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO₃) and filtered through a pressure filter containing an average filter size of 0.10 microns. The product is an organosiloxane copolymer of this invention having a viscosity of 4.32 cstk at a temperature of 25° C. The organosiloxane copolymer is a clear amber liquid with a calculated molecular weight of 509. The organosiloxane copolymer, hereinafter referred to as Organosiloxane Copolymer A, has the average composition:

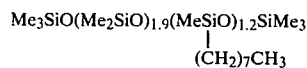
|
(CH₂)₇CH₃

The composition and properties of the organosiloxane copolymers of this invention are tabulated in Table II below.

EXAMPLE II

Part A: Preparation of Hydrosiloxane Fluid

Into a 500 ml three-necked reaction flask equipped with a mechanical stirrer was added a mixture comprised of 44.63 grams (0.28 mole) of hexamethyldisiloxane (Me₃SiOSiMe₃), 38.75 grams (0.52 mole) of cyclic dimethylsiloxane tetramer (Me₂SiO)₄, and 19.17 grams of a poly(methylhydrogensiloxane) containing about 0.32 equivalents of (MeHSiO). Also added to the reaction flask was about 2.05 grams (0.02 mole) of sulfuric acid (H₂SO₄) catalyst corresponding to about two weight percent of the total weight of the mixture. The mixture was stirred at room temperature for about four hours resulting in an equilibrated liquid product. The equilibrated liquid product was neutralized with four weight percent sodium bicarbonate (NaHCO₃) and then filtered through a pressure filter containing an average filter size of about 0.02 microns. The equilibrated liquid product, now properly designated a hydrosiloxane fluid, is a clear liquid with a viscosity of 1.81 cstk at a temperature of 25° C. The Si-H content of the hydrosiloxane fluid as determined by alkaline hydrolysis is 61.7 cc H₂ per gram of hydrosiloxane fluid and the calculated molecular weight is 363. The hydrosiloxane fluid has the average composition Me₃SiO(Me₂SiO)₁.₉(MeSiO)₁.₀SiMe₃
|
H and is hereinafter referred to as Hydrosiloxane Fluid II.

Part B: Preparation of Novel Organosiloxane Copolymer

Into a 500 ml three-necked reaction flask equipped with a mechanical stirrer, condenser and temperature controller was added 31.0 grams (0.09 mole) of Hydrosiloxane Fluid II. The Hydrosiloxane Fluid II was then heated to 85° C. and chloroplatinic acid solution was added to the reaction flask. To the reaction flask was also added dropwise 11.6 grams (0.10 mole) of 1-octene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO₃) and filtered through a pressure filter containing an average filter size of 0.10 microns. The product is an organosiloxane copolymer of this invention having a viscosity of 3.75 cstk at a temperature of 25° C. The organosiloxane copolymer has the average composition:

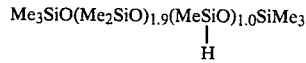
|
(CH₂)₇CH₃ and is hereinafter referred to as Organosiloxane Copolymer B.

EXAMPLE III

Part A: Preparation of Hydrosiloxane Fluid

Into a 500 ml three-necked reaction flask equipped with a mechanical stirrer was added a mixture comprised of 46.58 grams (0.29 mole) of hexamethyldisiloxane (Me₃SiOSiMe₃), 36.16 grams (0.49 mole) of cyclic dimethylsiloxane tetramer (Me₂SiO)₄, and 17.25 grams of a poly(methylhydrogensiloxane) containing about 0.29 equivalents of (MeHSiO). Also added to the reaction flask was about 2.0 grams (0.02 mole) of sulfuric acid (H₂SO₄) catalyst corresponding to about two weight percent of the total weight of the mixture. The mixture was stirred at room temperature for about four hours resulting in an equilibrated liquid product. The equilibrated liquid product was neutralized with four weight percent sodium bicarbonate (NaHCO₃) and then filtered through a pressure filter containing an average filter size of about 0.02 microns. The equilibrated liquid product, now properly designated a hydrosiloxane fluid, is a clear liquid with a viscosity of 1.70 cstk at a temperature of 25° C. The Si-H content of the hydrosiloxane fluid as determined by alkaline hydrolysis is 64.4 cc H₂ per gram of hydrosiloxane fluid and the calculated molecular weight is 348. The hydrosiloxane fluid has the average composition:

Me₃SiO(Me₂SiO)₁.₇(MeSiO)₁.₀SiMe₃
|
H and is hereinafter referred to as Hydrosiloxane Fluid III.

Part B: Preparation of Novel Organosiloxane Copolymer

Into a 500 ml three-necked reaction flask equipped with a mechanical stirrer, condenser and temperature controller was added 28.0 grams (0.08 mole) of Hydrosiloxane Fluid III. The Hydrosiloxane Fluid III was then heated to 85° C. and chloroplatinic acid solution was added to the reaction flask. To the reaction flask was also added dropwise 11.0 grams (0.10 mole) of 1-octene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO₃) and filtered through a pressure filter containing an average filter size of 0.10 microns. The product is an organosiloxane copolymer of this invention having a viscosity of 3.99 cstk at a temperature of 25° C. The organosiloxane copolymer is a clear amber liquid with a calculated molecular weight of 461. The organosiloxane copolymer has the average composition:

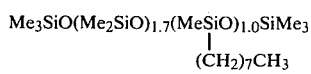

and is hereinafter referred to as Organosiloxane Copolymer C.

EXAMPLE IV

Part A: Preparation of Hydrosiloxane Fluid

Into a 500 ml three-necked reaction flask equipped with a mechanical stirrer was added a mixture comprised of 43.69 grams (0.27 mole) of hexamethyldisiloxane ($Me_3SiOSiMe_3$), 33.35 grams (0.45 mole) of cyclic dimethylsiloxane tetramer ($Me_2SiO)_4$, and 18.03 grams of a poly(methylhydrogensiloxane) containing about 0.30 equivalents of (MeHSiO). Also added to the reaction flask was about 2.0 grams (0.02 mole) of sulfuric acid ($H_2SO_4$) catalyst corresponding to about two weight percent of the total weight of the mixture. The mixture was stirred at room temperature for about four hours resulting in an equilibrated liquid product. The equilibrated liquid product was neutralized with four weight percent sodium bicarbonate ($NaHCO_3$) and then filtered through a pressure filter containing an average filter size of about 0.02 microns. The equilibrated liquid product, now properly designated a hydrosiloxane fluid, is a clear liquid with a viscosity of 1.60 cstk at a temperature of 25° C. The Si-H content of the hydrosiloxane fluid as determined by alkaline hydrolysis is 67.1 cc $H_2$ per gram of hydrosiloxane fluid and the calculated molecular weight is 334. The hydrosiloxane fluid has the average composition:

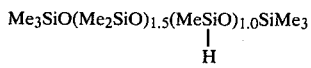

and is hereinafter referred to as Hydrosiloxane Fluid IV.

Part B: Preparation of Novel Organosiloxane Copolymer

Into a 500 ml three-necked reaction flask equipped with a mechanical stirrer, condenser and temperature controller was added 31.0 grams (0.09 mole) of Hydrosiloxane Fluid IV. The Hydrosiloxane Fluid IV was then heated to 85° C. and chloroplatinic acid solution was added to the reaction flask. To the reaction flask was also added dropwise 12.7 grams (0.11 mole) of 1-octene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate ($NaHCO_3$) and filtered through a pressure filter containing an average filter size of 0.10 microns. The product is an organosiloxane copolymer of this invention having a viscosity of 3.43 cstk at a temperature of 25° C. The organosiloxane copolymer is a clear amber liquid with a calculated molecular weight of 446. The organosiloxane copolymer has the average composition:

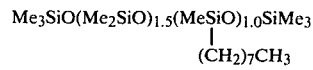

and is hereinafter referred to as Organosiloxane Copolymer D.

EXAMPLE V

Part A: Preparation of Hydrosiloxane Fluid

Into a 500 ml three-necked reaction flask equipped with a mechanical stirrer was added a mixture comprised of 37.17 grams (0.23 mole) of hexamethyldisiloxane ($Me_3SiOSiMe_3$), 41.46 grams (0.56 mole) of cyclic dimethylsiloxane tetramer ($Me_2SiO)_4$, and 20.67 grams of a poly(methylhydrogensiloxane) containing about 0.34 equivalent of (MeHSiO). Also added to the reaction flask was about 2.0 grams (0.02 mole) of sulfuric acid ($H_2SO_4$) catalyst corresponding to about two weight percent of the total weight of the mixture. The mixture was stirred at room temperature for about four hours resulting in an equilibrated liquid product. The equilibrated liquid product was neutralized with four weight percent sodium bicarbonate ($NaHCO_3$) and then filtered through a pressure filter containing an average filter size of about 0.02 microns. The equilibrated liquid product, now properly designated a hydrosiloxane fluid, is a clear liquid with a viscosity of 2.29 cstk at a temperature of 25° C. The Si-H content of the hydrosiloxane fluid as determined by alkaline hydrolysis is 76.7 cc $H_2$ per gram of hydrosiloxane fluid and the calculated molecular weight is 438. The hydrosiloxane fluid has the average composition:

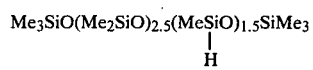

and is hereinafter referred to as Hydrosiloxane Fluid V.

Part B: Preparation of Novel Organosiloxane Copolymer

Into a 500 ml three-necked reaction flask equipped with a mechanical stirrer, condenser and temperature controller was added 34.0 grams (0.08 mole) of Hydrosiloxane Fluid V. The Hydrosiloxane Fluid V was then heated to 85° C. and chloroplatinic acid solution was added to the reaction flask. To the reaction flask was also added dropwise 15.3 grams (0.14 mole) of 1-octene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate ($NaHCO_3$) and filtered through a pressure filter containing an average filter size of 0.10 microns. The product is an organosiloxane copolymer of this invention having a viscosity of 5.73 cstk at a temperature of 25° C. The organosiloxane copolymer is a clear amber liquid with a calculated molecular weight of 606. The organosiloxane copolymer has the average composition:

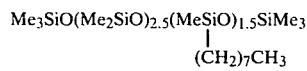

and is hereinafter referred to as Organosiloxane Copolymer E.

EXAMPLE VI

Part A: Preparation of Hydrosiloxane Fluid

Into a 500 ml three-necked reaction flask equipped with a mechanical stirrer was added a mixture comprised of 46.56 grams (0.29 mole) of hexamethyldisiloxane ($Me_3SiOSiMe_3$), 31.86 grams (0.43 mole) of cyclic dimethylsiloxane tetramer ($Me_2SiO)_4$, and 21.55 grams of a poly(methylhydrogensiloxane) containing about 0.36 equivalents of (MeHSiO). Also added to the reaction flask was about 2.0 grams (0.02 mole) of sulfuric acid ($H_2SO_4$) catalyst corresponding to about two weight percent of the total weight of the mixture. The mixture was stirred at room temperature for about four hours resulting in an equilibrated liquid product. The equilibrated liquid product was neutralized with four weight percent sodium bicarbonate ($NaHCO_3$) and then filtered through a pressure filter containing an average filter size of about 0.02 microns. The equilibrated liquiid product, now properly designated a hydrosiloxane fluid, is a clear liquid with a viscosity of 1.69 cstk at a temperature of 25° C. The Si-H content of the hydrosiloxane fluid as determined by alkaline hydrolysis is 80.2 cc $H_2$ per gram of hydrosiloxane fuid and the calculated molecular weight is 349. The hydrosiloxane fluid has the average composition:

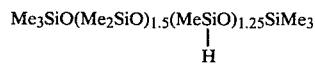

and is hereinafter referred to as Hydrosiloxane Fluid VI.

Part B: Preparation of Novel Organosiloxane Copolymer

Into a 500 ml three-necked reaction flask equipped with a mechanical stirrer, condenser and temperature controller was added 35.0 grams (0.10 mole) of Hydrosiloxane Fluid VI. The Hydrosiloxane Fluid VI was then heated to 85° C. and chloroplatinic acid solution was added to the reaction flask. To the reaction flask was also added dropwise 15.5 grams (0.14 mole) of 1-octene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate ($NaHCO_3$) and filtered through a pressure filter containing an average filter size of 0.10 microns. The product is an organosiloxane copolymer of this invention having a viscosity of 4.54 cstk at a temperature of 25° C. The organosiloxane copolymer is a clear amber liquid with a calculated molecular weight of 489. The organosiloxane copolymer has the average composition:

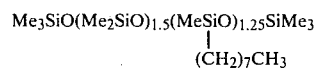

and is hereinafter referred to as Organosiloxane Copolymer F.

EXAMPLE VII

Part A: Preparation of Hydrosiloxane Fluid

Into a 500 ml three-necked reaction flask equipped with a mechanical stirrer was added a mixture comprised of 51.52 grams (0.32 mole) of hexamethyldisiloxane ($Me_3SiOSiMe_3$), 29.42 grams (0.40 mole) of cyclic dimethylsiloxane tetramer ($Me_2SiO)_4$, 19.05 grams of a poly(methylhydrogensiloxane) containing about 0.32 equivalents of (MeHSiO). Also added to the reaction flask was about 2.0 grams (0.02 mole) of sulfuric acid ($H_2SO_4$) catalyst corresponding to about two weight percent of the total weight of the mixture. The mixture was stirred at room temperature for about four hours resulting in an equilibrated liquid product. The equilibrated liquid product was neutralized with four weight percent sodium bicarbonate ($NaHCO_3$) and then filtered through a pressure filter containing an average filter size of about 0.02 microns. The equilibrated liquid product, now properly designated a hydrosiloxane fluid, is a clear liquid with a viscosity of 1.55 cstk at a temperature of 25° C. The Si-H content of the hydrosiloxane fluid as determined by alkaline hydrolysis is 71.1 cc $H_2$ per gram of hydrosiloxane fluid and the calculated molecular weight is 315. The hydrosiloxane fluid has the average composition.

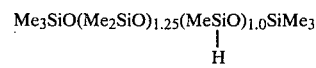

and is hereinafter referred to as Hydrosiloxane Fluid VII.

Part B: Preparation of Novel Organosiloxane Copolymer

Into a 500 ml three-necked reaction flask equipped with a mechanical stirrer, condenser and temperature controller was added 35.0 grams (0.11 mole) of Hydrosiloxane Fluid VII. The Hydrosiloxane Fluid VII was then heated to 85° C. and chloroplatinic acid solution was added to the reaction flask. To the reaction flask was also added dropwise 15.2 grams (0.13 mole) of 1-octene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate ($NaHCO_3$) and filtered through a pressure filter containing an average filter size of 0.10 microns. The product is an organosiloxane copolymer of this invention having a viscosity of 3.66 cstk at a temperature of 25° C. The organosiloxane copolymer is a clear amber liquid with a calculated molecular weight of 427. The organosiloxane copolymer has the average composition:

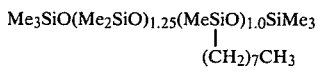

and is hereinafter referred to as Organosiloxane Copolymer G.

EXAMPLE VIII

Preparation of Novel Organosiloxane Copolymer

Into a 500 ml three-necked reaction flask equipped with a mechanical stirrer, condenser and temperature controller was added 31.0 grams (0.08 mole) of Hydrosiloxane Fluid I. The Hydrosiloxane Fluid I was then heated to 85° C. and Chloroplatinic Acid Solution was added to the reaction flask. To the reaction flask was also added dropwise 10.2 grams (0.12 mole) of 1-hexene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO$_3$) and filtered through a pressure filter containing an average filter size of 0.10 microns. The product is an organosiloxane copolymer of this invention having a viscosity of 3.37 cstk at a temperature of 25° C. The organosiloxane copolymer is a clear amber liquid with a calculated molecular weight of 476. The organosiloxane copolymer has the average composition:

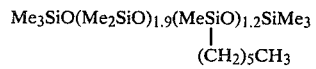

and is hereinafter referred to as Organosiloxane Copolymer H.

EXAMPLE IX

Preparation of Novel Organosiloxane Copolymer

Into a 500 ml three-necked reaction flask equipped with a mechanical stirrer, condenser and temperature controller was added 31.0 grams (0.09 mole) of Hydrosiloxane Fluid II. The Hydrosiloxane Fluid II was then heated to 85° C. and Chloroplatinic Acid Solution was added to the reaction flask. To the reaction flask was also added dropwise 8.75 grams (0.10 mole) of 1-hexene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO$_3$) and filtered through a pressure filter containing an average filter size of 0.10 microns. The product is an organosiloxane copolymer of this invention having a viscosity of 3.21 cstk at a temperature of 25° C. The organosiloxane copolymer is a clear amber liquid with a calculated molecular weight of 447. The organosiloxane copolymer has the average composition:

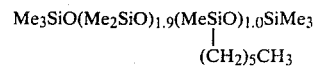

and is hereinafter referred to as Organosiloxane Copolymer I.

EXAMPLE X

Preparation of Novel Organosiloxane Copolymer

Into a 500 ml three-necked reaction flask equipped with a mechanical stirrer, condenser and temperature controller was added 28.0 grams (0.08 mole) of Hydrosiloxane Fluid III. The Hydrosiloxane Fluid III was then heated to 85° C. and Chloroplatinic Acid Solution was added to the reaction flask. To the reaction flask was also added dropwise 8.25 grams (0.10 mole) of 1-hexene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO$_3$) and filtered through a pressure filter containing an average filter size of 0.10 microns. The product is an organosiloxane copolymer of this invention having a viscosity of 3.30 cstk at a temperature of 25° C. The organosiloxane copolymer is a clear amber liquid with a calculated molecular weight of 433. The organosiloxane copolymer has the average composition:

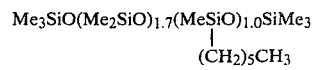

and is hereinafter referred to as Organosiloxane Copolymer J.

EXAMPLE XI

Preparation of Novel Organosiloxane Copolymer

Into a 500 ml three-necked reaction flask equipped with a mechanical stirrer, condenser and temperature controller was added 31.0 grams (0.09 mole) of Hydrosiloxane Fluid IV. The Hydrosiloxane Fluid IV was then heated to 85° C. and Chloroplatinic Acid Solution was added to the reaction flask. To the reaction flask was also added dropwise 9.6 grams (0.11 mole) of 1-hexene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO$_3$) and filtered through a pressure filter containing an average filter size of 0.10 microns. The product is an organosiloxane copolymer of this invention having a viscosity of 2.73 cstk at a temperature of 25° C. The organosiloxane copolymer is a clear amber liquid with a calculated molecular weight of 418. The organosiloxane copolymer has the average composition:

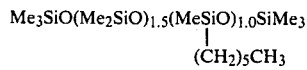

and is hereinafter referred to as Organosiloxane Copolymer K.

EXAMPLE XII

Preparation of Novel Organosiloxane Copolymer

Into a 500 ml three-necked reaction flask equipped with a mechanical stirrer, condenser and temperature controller was added 34.0 grams (0.08 mole) of Hydrosiloxane Fluid V. The Hydrosiloxane Fluid V was then heated to 85° C. and Chloroplatinic Acid Solution was added to the reaction flask. To the reaction flask was also added dropwise 11.49 grams (0.14 mole) of 1-hexene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO$_3$) and filtered through a pressure filter containing an average filter size of 0.10 microns. The product is an organosiloxane copolymer of this invention having a viscosity of 4.54 cstk at a temperature of 25° C. The organosiloxane copolymer is a clear amber liquid with a calculated molecular weight of 564. The organosiloxane copolymer has the average composition:

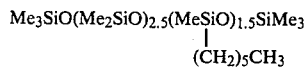

and is hereinafter referred to as Organosiloxane Copolymer L.

EXAMPLE XIII

Preparation of Novel Organosiloxane Copolymer

Into a 500 ml three-necked reaction flask equipped with a mechanical stirrer, condenser and temperature controller was added 35.0 grams (0.10 mole) of Hydrosiloxane Fluid VI. The Hydrosiloxane Fluid VI was then heated to 85° C. and Chloroplatinic Acid Solution was added to the reaction flask. To the reaction flask was also added dropwise 12.37 grams (0.15 mole) of 1-hexene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO$_3$) and filtered through a pressure filter containing an average filter size of 0.10 microns. The product is an organosiloxane copolymer of this invention having a viscosity of 3.50 cstk at a temperature of 25° C. The organosiloxane copolymer is a clear amber liquid with a calculated molecular weight of 454. The organosiloxane copolymer has the average composition:

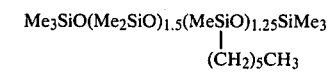

and is hereinafter referred to as Organosiloxane Copolymer M.

EXAMPLE XIV

Preparation of Novel Organosiloxane Copolymer

Into a 500 ml three-necked reaction flask equipped with a mechanical stirrer, condenser and temperature controller was added 35.0 grams (0.11 mole) of Hydrosiloxane Fluid VII. The Hydrosiloxane Fluid VII was then heated to 85° C. and Chloroplatinic Acid Solution was added to the reaction flask. To the reaction flask was also added dropwise 9.1 grams (0.13 mole) of 1-pentene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO$_3$) and filtered through a pressure filter containing an average filter size of 0.10 microns. The product is an organosiloxane copolymer of this invention having a viscosity of 2.87 cstk at a temperature of 25° C. The organosiloxane copolymer is a clear amber liquid with a calculated molecular weight of 385. The organosiloxane copolymer has the average composition:

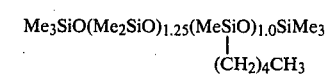

and is hereinafter referred to as Organosiloxane Copolymer N. cl EXAMPLE XV

Part A: Preparation of Hydrosiloxane Fluid

Into a 500 ml three-necked reaction flask equipped with a mechanical stirrer was added a mixture comprised of 32.40 grams (0.20 mole) of hexamethyldisiloxane (Me$_3$SiOSiMe$_3$), 44.4 grams (0.60 mole) of cyclic dimethylsiloxane tetramer (Me$_2$SiO)$_4$, and 12.0 grams of a poly(methylhydrogensiloxane) containing about 0.20 equivalents of (MeHSiO). Also added to the reaction flask was about 2.0 grams (0.02 mole) of sulfuric acid (H$_2$SO$_4$) catalyst corresponding to about two weight percent of the total weight of the mixture. The mixture was stirred at room temperature for about four hours resulting in an equilibrated liquid product. The equilibrated liquid product was neutralized with four weight percent sodium bicarbonate (NaHCO$_3$) and then filtered through a pressure filter containing an average filter size of about 0.02 microns. The equilibrated liquid product, now properly designated a hydrosiloxane fluid, is a clear liquid with a viscosity of 3.10 cstk at a temperature of 25° C. The Si-H content of the hydrosiloxane fluid as determined by alkaline hydrolysis is 50.45 cc H$_2$ per gram of hydrosiloxane fluid and the calculated molecular weight is 444. The hydrosiloxane fluid has the average composition:

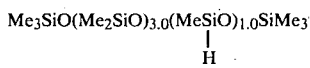

and is hereinafter referred to as Hydrosiloxane Fluid VIII.

Part B: Preparation of Novel Organosiloxane Copolymer

Into a 500 ml three-necked reaction flask equipped with a mechanical stirrer, condenser and temperature controller was added 40.0 grams (0.09 mole) of Hydrosiloxane Fluid VIII. The Hydrosiloxane Fluid VIII was then heated to 85° C. and Chloroplatinic Acid Solution was added to the reaction flask. To the reaction flask was also added dropwise 7.56 grams (0.11 mole) of 1-pentene in 20 percent excess concentration. An exothermic reaction occurred which was monitored by taking a one cc sample from the reaction flask and checking for residual Si-H content by measuring the hydrogen released upon alkaline hydrolysis in a fermentation tube test. After all the Si-H had reacted, the reaction flask was cooled to room temperature. The product so produced was neutralized with sodium bicarbonate (NaHCO$_3$) and filtered through a pressure filter containing an average filter size of 0.10 microns. The product is an organosiloxane copolymer of this invention having a viscosity of 5.62 cstk at a temperature of 25° C. The organosiloxane copolymer is a clear amber liquid with a calculated molecular weight of 556. The organosiloxane copolymer has the average composition:

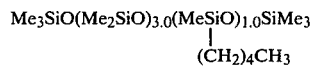

and is hereinafter referred to as Organosiloxane Copolymer O.

EXAMPLE XVI

Part A: Preparation of Hydrosiloxane Fluid

Into a 500 ml three-necked reaction flask equipped with a mechanical stirrer, condenser and temperature controller was added a mixture comprised of 23.8 grams (0.18 mole) of S-tetramethyldisiloxane (HMe$_2$SiOSiMe$_2$H) and 26.2 grams (0.35 mole) of cyclic dimethylsiloxane tetramer (Me$_2$SiO)$_4$. The mixture was heated to 40° C. and stirred for four hours in the presence of anhydrous trifluoromethyl sulfonic acid (CF$_3$SO$_3$H). This heating and stirring process resulted in an equilibrated liquid product. The equilibrated liquid product was neutralized with four weight percent sodium bicarbonate (NaHCO$_3$) and then filtered through a pressure filter containing an average filter size of about 0.02 microns. The equilibrated liquid product, now properly designated a hydrosiloxane fluid, is a clear liquid with a viscosity of 2.40 cstk at a temperature of 25° C. and a calculated molecular weight of 282. The hydrosiloxane fluid has the average composition:

HMe$_2$SiO(Me$_2$SiO)$_2$SiMe$_2$H and is hereinafter referred to as Hydrosiloxane Fluid IX. The composition and properties of Hydrosiloxane Fluids IX through XII of this invention are tabulated in Table III below.

Part B: Preparation of Novel Organosiloxane Copolymer

Into a 500 ml three-necked reaction flask equipped with a mechanical stirrer, condenser and temperature controller was added 27.86 grams (0.10 mole) of Hydrosiloxane Fluid IX. The Hydrosiloxane Fluid IX was then heated to 75° C. To the reaction flask was also added dropwise 26.6 grams (0.24 mole) of 1-octene in 20 percent excess concentration and Chloroplatinic Acid Solution. The product so produced was neutralized with sodium bicarbonate (NaHCO$_3$) and filtered through a pressure filter containing an average filter size of 0.10 microns. The product is an organosiloxane copolymer of this invention having a viscosity of 4.0 cstk at a temperature of 25° C. The organosiloxane copolymer is a clear amber liquid with a calculated molecular weight of 506. The organosiloxane copolymer has the average composition:

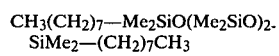

and is hereinafter referred to as Organosiloxane Copolymer P. The composition and properties of Organosiloxane Copolymers P through T of this invention are tabulated in Table IV below.

EXAMPLE XVII

Part A: Preparation of Hydrosiloxane Fluid

Into a 500 ml three-necked reaction flask equipped with a mechanical stirrer, condenser and temperature controller was added a mixture comprised of 18.83 grams (0.14 mole) of s-tetramethyldisiloxane (HMe$_2$SiOSiMe$_2$H) and 31.15 grams (0.42 mole) of cyclic dimethylsiloxane tetramer (Me$_2$SiO)$_4$. The mixture was heated to 40° C. and stirred for four hours in the presence of anhydrous trifluoromethyl sulfonic acid (CF$_3$SO$_3$H). This heating and stirring process resulted in an equilibrated liquid product. The equilibrated liquid product was neutralized with four weight percent sodium bicarbonate (NaHCO$_3$) and then filtered through a pressure filter containing an average filter size of about 0.02 microns. The equilibrated liquid product, now properly designated a hydrosiloxane fluid, is a clear liquid with a viscosity of 2.43 cstk at a temperature of 25° C. and a calculated molecular weight of 356. The hydrosiloxane fluid has the average composition:

and is hereinafter referred to as Hydrosiloxane Fluid X.

Part B: Preparation of Novel Organosiloxane Copolymer

Into a 500 ml three-necked reaction flask equipped with a mechanical stirrer, condenser and temperature controller was added 30.69 grams (0.09 mole) of Hydrosiloxane Fluid X. The Hydrosiloxane Fluid X was then heated to 75° C. To the reaction flask was also added dropwise 33.18 grams (0.29 mole) of 1-octene in 20 percent excess concentration and Chloroplatinic Acid Solution. The product so produced was neutralized with sodium bicarbonate (NaHCO$_3$) and filtered through a pressure filter containing an average filter size of 0.10 microns. The product is an organosiloxane copolymer of this invention having a viscosity of 5.30 cstk at a temperature of 25° C. The organosiloxane copolymer is a clear amber liquid with a calculated molecular weight of 580. The organosiloxane copolymer has the average composition:

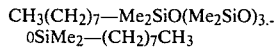
CH$_3$(CH$_2$)$_7$—Me$_2$SiO(Me$_2$SiO)$_3$.$_0$SiMe$_2$—(CH$_2$)$_7$CH$_3$ and is hereinafter referred to as Organosiloxane Copolymer Q.

EXAMPLE XVIII

Part A: Preparation of Hydrosiloxane Fluid

Into a 500 ml three-necked reaction flask equipped with a mechanical stirrer, condenser and temperature controller was added a mixture comprised of 26.8 grams (0.20 mole) of s-tetramethyldisiloxane (HMe$_2$SiOSiMe$_2$H) and 63.0 grams (0.85 mole) of cyclic dimethylsiloxane tetramer (Me$_2$SiO)$_4$. The mixture was heated to 40° C. and stirred for four hours in the presence of anhydrous trifluoromethylsulfonic acid (CF$_3$SO$_3$H). This heating and stirring process resulted in an equilibrated liquid product. The equilibrated liquid product was neutralized with four weight percent sodium bicarbonate (NaHCO$_3$) and then filtered through a pressure filter containing an average filter size of about 0.02 microns. The equilibrated liquid product, now properly designated a hydrosiloxane fluid, is a clear liquid with a viscosity of 2.60 cstk at a temperature of 25° C. and a calculated molecular weight of 449. The hydrosiloxane fluid has the average composition:

HMe$_2$SiO(Me$_2$SiO)$_{4.25}$SiMe$_2$H and is hereinafter referred to as Hydrosiloxane Fluid XI.

Part B: Preparation of Novel Organosiloxane Copolymer

Into a 500 ml three-necked reaction flask equipped with a mechanical stirrer, condenser and temperature controller was added 44.9 grams (0.10 mole) of Hydrosiloxane Fluid XI. The Hydrosiloxane Fluid XI was then heated to 75° C. To the reaction flask was also added dropwise 57.1 grams (0.51 mole) of a 1-octene in 20 percent excess concentration and Chloroplatinic Acid Solution. The product so produced was neutralized with sodium bicarbonate (NaHCO$_3$) and filtered through a pressure filter containing an average filter size of 0.10 microns. The product is an organosiloxane copolymer of this invention having a viscosity of 14.5 cstk at a temperature of 25° C. The organosiloxane copolymer is a clear amber liquid with a calculated molecular weight of 673. The organosiloxane copolymer has the average composition:

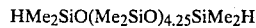
CH$_3$(CH$_2$)$_7$—Me$_2$SiO(Me$_2$SiO)$_{4.25}$SiMe$_2$—(CH$_2$)$_7$CH$_3$ and is hereinafter referred to as Organosiloxane Copolymer R.

EXAMPLE XIX

Part A: Preparation of Hydrosiloxane Fluid

Into a 500 ml three-necked reaction flask equipped with a mechanical stirrer, condenser and temperature controller was added a mixture comprised of 26.8 grams (0.20 mole) of s-tetramethyldisiloxane (HMe$_2$SiOSiMe$_2$H) and 74.0 grams (1.0 mole) of cyclic dimethylsiloxane tetramer (Me$_2$SiO)$_4$. The mixture was heated to 40° C. and stirred for four hours in the presence of anhydrous trifluoromethylsulfonic acid (CF$_3$SO$_3$H). This heating and stirring process resulted in an equilibrated liquid product. The equilibrated liquid product was neutralized with four weight percent sodium bicarbonate (NaHCO$_3$) and then filtered through a pressure filter containing an average filter size of about 0.02 microns. The equilibrated liquid product, now properly designated a hydrosiloxane fluid, is a clear liquid with a viscosity of 2.89 cstk at a temperature of 25° C. and a calculated molecular weight of 505. The hydrosiloxane fluid has the average composition,

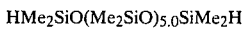
HMe$_2$SiO(Me$_2$SiO)$_{5.0}$SiMe$_2$H and is hereinafter referred to as Hydrosiloxane Fluid XII.

Part B: Preparation of Novel Organosiloxane Copolymer

Into a 500 ml three-necked reaction flask equipped with a mechanical stirrer, condenser and temperature controller was added 50.1 grams (0.10 mole) of Hydrosiloxane Fluid XII. The Hydrosiloxane Fluid XII was then heated to 75° C. To the reaction flask was also added dropwise 67.3 grams (0.60 mole) of 1-octene in 20 percent excess concentration and Chloroplatinic Acid Solution. The product so produced was neutralized with sodium bicarbonate (NaHCO$_3$) and filtered through a pressure filter containing an average filter size of 0.10 microns. The product is an organosiloxane copolymer of this invention having a viscosity of 14.1 cstk at a temperature of 25° C. The organosiloxane copolymer is a clear amber liquid with a calculated molecular weight of 729. The organosiloxane copolymer has the average composition:

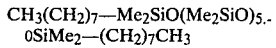
CH$_3$(CH$_2$)$_7$—Me$_2$SiO(Me$_2$SiO)$_{5.0}$SiMe$_2$—(CH$_2$)$_7$CH$_3$ and is hereinafter referred to as Organosiloxane Copolymer S.

EXAMPLE XX

Preparation of Novel Organosiloxane Copolymer

Into a 500 ml three-necked reaction flask equipped with a mechanical stirrer, condenser and temperature controller was added 56.5 grams (0.20 mole) of Hydrosiloxane Fluid IX. The Hydrosiloxane Fluid IX was then heated to 75° C. To the reaction flask was also added dropwise 33.6 grams (0.47 mole) of 1-pentene in 20 percent excess concentration and Chloroplatinic Acid Solution. The product so produced was neutralized with sodium bicarbonate (NaHCO$_3$) and filtered through a pressure filter containing an average filter size of 0.10 microns. The product is an organosiloxane copolymer of this invention having a viscosity of 3.8 cstk at a temperature of 25° C. The organosiloxane copolymer is a clear amber liquid with a calculated molecular weight of 422. The organosiloxane copolymer has the average composition:

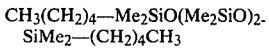
CH$_3$(CH$_2$)$_4$—Me$_2$SiO(Me$_2$SiO)$_2$SiMe$_2$—(CH$_2$)$_4$CH$_3$ and is hereinafter referred to as Organosiloxane Copolymer T.

EXAMPLES XXI THROUGH XXXIX

In accordance with these examples, high resilience polyurethane foams were produced using the above described organosiloxane copolymers of the present invention as the foam stabilizing surfactant component of the foam-producing reaction mixtures. For the purpose of comparison, two commercially available foam stabilizing surfactants outside the scope of this invention were used and are designated herein as Organosiloxane Copolymer AA and Organosiloxane Copolymer BB. These siloxane-oxyalkylene foam stabilizing surfactants have the following average composition:

Organosiloxane Copolymer AA

A high resiliency foam surfactant within the scope of U.S. Pat. No. 3,741,917.

Organosiloxane Copolymer BB

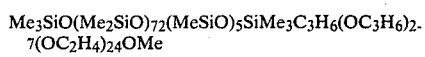
Me$_3$SiO(Me$_2$SiO)$_{72}$(MeSiO)$_5$SiMe$_3$C$_3$H$_6$(OC$_3$H$_6$)$_{2-7}$(OC$_2$H$_4$)$_{24}$OMe (A hot cure flexible foam surfactant)
Additionally, four other foam stabilizing surfactants outside the scope of this invention were used for the purpose of comparison and are designated herein as Organosiloxane Copolymer CC, Organosiloxane Copolymer DD, Organosiloxane Copolymer EE and Organosiloxane Copolymer FF. These alkyl-modified siloxane copolymer surfactants have the following average composition:

Organosiloxane Copolymer CC

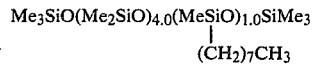

Me$_3$SiO(Me$_2$SiO)$_{4.0}$(MeSiO)$_{1.0}$SiMe$_3$
　　　　　　　　　　　|
　　　　　　　　　(CH$_2$)$_7$CH$_3$ (A cold cure high resilience foam surfactant with n:p ratio of 4.0).

Organosiloxane Copolymer DD

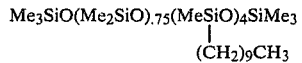

Me$_3$SiO(Me$_2$SiO)$_{.75}$(MeSiO)$_4$SiMe$_3$
　　　　　　　　　　　|
　　　　　　　　　(CH$_2$)$_9$CH$_3$ (A cold cure high resilience foam surfactant with n:p ratio of 0.19).

Organosiloxane Copolymer EE

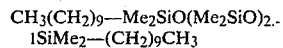
CH$_3$(CH$_2$)$_9$—Me$_2$SiO(Me$_2$SiO)$_{2}$-
　　　　|SiMe$_2$—(CH$_2$)$_9$CH$_3$ (A cold cure high resilience foam surfactant containing 49.5 weight percent R' groups).

Organosiloxane Copolymer FF

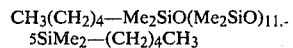
CH$_3$(CH$_2$)$_4$—Me$_2$SiO(Me$_2$SiO)$_{11.5}$SiMe$_2$—(CH$_2$)$_4$CH$_3$ (A cold cure high resilience foam surfactant containing 12.6 weight percent R' groups).

The composition of the foam-producing reaction mixtures are given below in Table A.

TABLE A

| Ingredients | FOAM FORMULATIONS Low Density Foam (PHPP) |
|---|---|
| Polyol I | 60 |
| Polyol II | 40 |
| Polymer/Polyol I | — |
| Catalyst I | 0.15 |
| H$_2$O | 3.5 |
| Catalyst II | — |
| Catalyst III | 0.50 |
| Catalyst IV | — |
| Polyol I | — |
| Catalyst V | 0.10 |
| Organosiloxane Copolymer Surfactant | Varied |
| Catalyst VI | 1.7 |
| Blowing Agent I | 7.0 |
| Isocyanate I | 44.7 |
| Isocyanate II | — |
| Flame Retardant I | 2.0 |

The foam-producing reactions of Examples XXI through XXXV were carried out in accordance with substantially the same general procedure which entailed the following steps. The organosiloxane copolymer surfactant and dibutyltindilaurate were premixed and dispersed with a spatula. The polyols and polymer/polyol of Table A were premixed and 250 grams were dispersed in a Lily cup. The organosiloxane copolymer surfactant/dibutyltindilaurate premix was added by a five cc syringe into the polyol/polyol premix and dispersed with a spatula until homogeneous, forming a polyol/surfactant blend in the Lily cup. A premix consisting of water, blowing agent and the remaining catalysts of Table A was added to the polyol/surfactant blend and dispersed with a spatula in the Lily cup until homogeneous. The Lily cup containing the foaming components was placed under a drill press equipped with a double three-bladed marine-type propeller about three inches in diameter. The mixing in the drill press was accomplished at 2150 revolutions per minute for ten seconds. Due to the high viscosity of the polyol/polymer-polyol mixture, the Lily cup must be moved around to insure proper mixing. Then the isocyanate was added rapidly to the other components without stopping the drill press and mixing continued for another seven seconds. The reaction mixture was immediately poured into an 8 in.×8 in.×6 in. cake box supported by a wooden mold and allowed to rise. The foam was allowed to rest in the cake box for two minutes after completion of the rise to avoid densification at the bottom of the foam bun. The foam was then cured for about ten minutes at 125° C. and samples of the foam products were prepared for experimental evaluations.

The organosiloxane copolymer surfactants represented by Formula (I) and Formula (II) of this invention were employed as a solution in the formulation of polyurethane foam. The solution consisted of 2.5 weight percent organosiloxane copolymer surfactant and 97.5 weight percent Polyol I. The comparative organosiloxane copolymer surfactants outside the scope of this invention were also employed as a solution in the formulation of polyurethane foam. Organosiloxane Copolymer AA was employed in a solution consisting of 10 to 35 weight percent organosiloxane copolymer and 65 to 90 weight percent polyol solvent. Organosiloxane Copolymer BB was employed in a solution consisting of 40 to 60 weight percent organosiloxane copolymer and 40 to 60 weight percent polyol solvent. Organosiloxane Copolymers CC, DD, EE and FF were employed in a solution consisting of 2.5 weight percent organosiloxane copolymer and 97.5 weight percent Polyol I.

The results of examples in which organosiloxane copolymers of the type represented by formula (I) above are utilized as the foam stabilizing surfactant component of the foam-producing reaction mixture are given in Table B below.

TABLE B

EVALUATION OF ORGANOSILOXANE COPOLYMERS (FORMULA I TYPE)

| EXAMPLE | ORGANO-SILOXANE COPOLYMER | ORGANOSILOXANE COPOLYMER STRUCTURE | CONCENTRATION (PHPP)* | COARSE CELLS | SHRINKAGE |
|---|---|---|---|---|---|
| XXI | A | $Me_3SiO(Me_2SiO)_{1.9}(MeSiO)_{1.2}SiMe_3$ with $(CH_2)_7CH_3$ | 0.5 | None | None |
| | | | 4.5 | None | Slight |
| | | | 6.0 | None | Moderate |
| | | | 8.0 | None | Severe |
| XXII | B | $Me_3SiO(Me_2SiO)_{1.9}(MeSiO)_{1.0}SiMe_3$ with $(CH_2)_7CH_3$ | 0.5 | None | None |
| | | | 6.0 | None | None |
| | | | 7.0 | None | Slight |
| | | | 8.0 | None | Moderate |
| XXIII | C | $Me_3SiO(Me_2SiO)_{1.7}(MeSiO)_{1.0}SiMe_3$ with $(CH_2)_7CH_3$ | 0.6 | None | None |
| | | | 6.0 | None | None |
| | | | 8.0 | None | Slight-Moderate |
| XXIV | D | $Me_3SiO(Me_2SiO)_{1.5}(MeSiO)_{1.0}SiMe_3$ with $(CH_2)_7CH_3$ | 0.6 | Very Slight | None |
| | | | 6.0 | None | None |
| | | | 8.0 | None | None |
| | | | 9.0 | None | None |
| | | | 11.0 | None | Slight |
| XXV | G | $Me_3SiO(Me_2SiO)_{1.25}(MeSiO)_{1.0}SiMe_3$ with $(CH_2)_7CH_3$ | 0.75 | Very Slight | None |
| | | | 1.0 | None | None |
| | | | 7.0 | None | None |
| | | | 11.0 | None | None |
| | | | 12.0 | None | Very Slight |
| XXVI | H | $Me_3SiO(Me_2SiO)_{1.9}(MeSiO)_{1.2}SiMe_3$ with $(CH_2)_5CH_3$ | 0.5** | Very Slight | None |
| | | | 3.0 | None | Slight |
| | | | 4.0 | None | Moderate |
| XXVII | I | $Me_3SiO(Me_2SiO)_{1.9}(MeSiO)_{1.0}SiMe_3$ with $(CH_2)_5CH_3$ | 0.5*** | Very Slight | None |
| | | | 6.0 | None | Very Slight |
| | | | 8.0 | None | Moderate |

*Concentration of surfactant solution
**All concentrations above 0.5 and below 3.0 produce satisfactory foams.
***All concentrations above 0.5 and below 6.0 produce satisfactory foams.

EVALUATION OF ORGANOSILOXANE COPOLYMERS (FORMULA I TYPE) IN MOLDING TEST (BENCH)

| EXAMPLE | ORGANO-SILOXANE COPOLYMER | ORGANOSILOXANE COPOLYMER STRUCTURE | CONCENTRATION* (PHPP) | COARSE CELLS | SHRINKAGE |
|---|---|---|---|---|---|
| XXVIII | J | $Me_3SiO(Me_2SiO)_{1.7}(MeSiO)_{1.0}SiMe_3$ with $(CH_2)_5CH_3$ | 0.6 | Very Slight | None |
| | | | 6.0 | None | None |
| | | | 7.0 | None | Slight |
| | | | 8.0 | None | Moderate |
| XXIX | K | $Me_3SiO(Me_2SiO)_{1.5}(MeSiO)_{1.0}SiMe_3$ with $(CH_2)_5CH_3$ | 0.5 | | |
| | | | 0.6 | Slight | None |
| | | | 6.0 | None | None |
| | | | 8.0 | None | None |
| | | | 10.0 | None | None |
| | | | | None | Slight |
| XXX | N | $Me_3SiO(Me_2SiO)_{1.25}(MeSiO)_{1.0}SiMe_3$ with $(CH_2)_4CH_3$ | 0.6 | Very Slight | None |
| | | | 1.8 | None | None |
| | | | 7.0 | None | None |
| | | | 10.0 | None | Very Slight |
| XXXI | AA | A high resiliency foam surfactant within the scope of U.S. Pat. No. 3,741,917. | 0.1 | Coarse | None |
| | | | 0.15 | Slight | None |
| | | | 0.2 | None | None |
| | | | 0.3 | None | Severe |
| XXII | BB | $Me_3SiO(Me_2SiO)_{72}(MeSiO)_5SiMe_3$ with $C_3H_6(OC_3H_6)_{27}(OC_2H_4)_{24}OMe$ | 0.006 | None | Severe |

*Concentration of surfactant solution.

EVALUATION OF ORGANOSILOXANE COPOLYMERS (FORMULA I TYPE)

| EXAMPLE | ORGANO-SILOXANE COPOLYMER | ORGANOSILOXANE COPOLYMER STRUCTURE | CONCENTRATION* (PHPP) | COARSE CELLS | SHRINKAGE |
|---|---|---|---|---|---|
| XXXIII | CC | $Me_3SiO(Me_2SiO)_{4.0}(MeSiO)_{1.0}SiMe_3$ with $(CH_2)_7CH_3$ | 0.1 | Slight | None |
| | | | 0.15 | None | None |
| | | | 0.20 | Slight | Very Slight |
| | | | 0.50 | **Glossy Appearance Defoam Areas | Severe |

TABLE B-continued

| | | | | | |
|---|---|---|---|---|---|
| XXXIV | DD | $Me_3SiO(Me_2SiO)_{.75}(MeSiO)_{4.0}SiMe_3$<br>                            $\|$<br>                           $(CH_2)_9CH_3$ | 0.05<br>0.10<br>0.15<br>0.50 | Coarse<br>Coarse<br>Coarse<br>Slight | Moderate<br>Moderate<br>Severe<br>Total Shrinkage 50% of foam Volume Lost |

*Concentration of surfactant solution.
**Glossy appearance is indicative of poor quality foam.

The data of Table B demonstrates that the organosiloxane copolymers of this invention are effective stabilizers in high resilience polyurethane foam formulations.

The results of examples in which organosiloxane copolymers of the type represented by Formula (II) above are utilized as the foam stabilizing surfactant component of the foam-producing mixture are given in Table C below.

TABLE C

EVALUATION OF ORGANOSILOXANE COPOLYMERS (FORMULA II TYPE) IN MOLDING TEST (BENCH)

| EXAMPLE | ORGANO-SILOXANE COPOLYMER | ORGANOSILOXANE COPOLYMER STRUCTURE | CONCENTRATION* (PHPP) | COARSE CELLS | SHRINKAGE |
|---|---|---|---|---|---|
| XXXV | P | $CH_3(CH_2)_7-MeSiO(Me_2SiO)_2SiMe_2-(CH_2)_7CH_3$ | 0.6 | Slight | None |
| | | | 0.75 | None | None |
| | | | 0.8 | None | None |
| | | | 2.0 | None | None |
| | | | 5.0 | None | None |
| | | | 7.0 | None | None |
| | | | 9.0 | None | None |
| | | | 10.0 | None | Slight |
| XXXVI | Q | $CH_3(CH_2)_7-Me_2SiO(Me_2SiO)_3SiMe_2-(CH_2)_7CH_3$ | 0.3 | None | None |
| | | | 0.5 | None | None |
| | | | 0.75 | None | None |
| | | | 5.0 | None | None |
| | | | 7.0 | None | Slight |
| XXXVII | S | $CH_3(CH_2)_7-Me_2SiO(Me_2SiO)_{5.0}SiMe_2-(CH_2)_7CH_3$ | 0.1 | Slight | None |
| | | | 0.5 | None | None |
| | | | 1.0 | None | None |
| | | | 2.0 | None | None |
| | | | 3.0 | None | None |
| | | | 3.5 | None | Slight |
| XXXVIII | EE | $CH_3(CH_2)_9-Me_2SiO(Me_2SiO)_{2.1}SiMe_2-(CH_2)_9CH_3$ | 0.05 | Very Coarse | None |
| | | | 1.0 | Coarse | Very Slight |
| | | | 2.0 | Coarse | Slight |
| | | | 3.5 | Very Slight | Slight |
| | | | 4.0 | None | Moderate |
| XXXIX | FF | $CH_3(CH_2)_4-Me_2SiO(Me_2SiO)_{11.5}SiMe_2-(CH_2)_4CH_3$ | 0.01 | Slight | None |
| | | | 0.02 | Very Slight | Slight |
| | | | 0.10 | None | Moderate |
| | | | 0.30 | None | Severe |

*Concentration of surfactant solution.

The data of Table C also demonstrates that the organosiloxane copolymers of this invention are effective stabilizers in high resilience polyurethane foam formulations.

EXAMPLE XL

Organosiloxane Copolymer G was evaluated on an industrial scale machine as a foam stabilizing surfactant component in the formulation of high resilience polyurethane foam. The molding and free rise conditions of the industrial scale machine are described in Table D below.

TABLE D

MOLDING AND FREE RISE CONDITIONS

| Conditions | I | II |
|---|---|---|
| Machine | Admiral 170 lb./min. | Admiral 170 lb./min. |
| Metal to Metal Seal | ¼ in. vent holes | Sealed 1/16 in. vent holes |
| Mixer Speed | 4500 RPM | 4500 RPM |
| Ambient Temperature | 75° C. | 75° C. |
| Pour Time | 3.4–3.7 seconds | 3.4–3.7 seconds |
| Release Agent | Brulins Wax | Brulins Wax |
| Soak Time | 5 minutes | 5 minutes |
| Past Cure | 2 minutes at room temperature | 2 minutes Infrared |
| Pad Weight | 3700–3800 grams | 3700–3800 grams |
| Conveyor Speed | 70 ft./min. | 70 ft./min. |
| Order No. | 5100 | 5100 |
| Reference No. | BA-121,122 | Ba-121,122 |

| FREE RISE FOAM | |
|---|---|
| 1 Quart Cups Mixer Speed | 2500 RPM |
| Mixing Time | 60 sec. Resin Mix<br>25 sec. Degas<br>5 sec. Isocyanate Mix |
| Cure | Room Temperature |

The results of utilizing Organosiloxane Copolymer G as a foam stabilizing surfactant component for the formulation of high resilience polyurethane foam employing an industrial scale machine are described in Table E below.

TABLE E

EVALUATION OF ORGANOSILOXANE COPOLYMER G IN INDUSTRIAL MACHINE

| EXAMPLE | Organosiloxane Copolymer | Organosiloxane Copolymer Structure | Concentration* (PHPP) | Coarse Cells | Shrinkage |
|---|---|---|---|---|---|
| XL | G | $Me_3SiO(Me_2SiO)_{1.25}(MeSiO)_{1.0}SiMe_3$<br>$\qquad\qquad\qquad\qquad\quad\;\; \mid$<br>$\qquad\qquad\qquad\qquad\;\; (CH_2)_7CH_3$ | 0.4 | Slight | None |
|  |  |  | 0.6 | Very Slight | None |
|  |  |  | 0.8 | None | None |
|  |  |  | 1.0 | None | None |
|  |  |  | 1.25 | None | None |
|  |  |  | 1.50 | None | None |
|  |  |  | 1.75 | None | None |
|  |  |  | 2.00 | None | None |

*Concentration of surfactant solution.

The data of Table E demonstrates that Organosiloxane Copolymer G of this invention is also an effective stabilizer for high resilience polyurethane foam formulated in an industrial scale machine.

TABLE I

HYDROSILOXANE FLUIDS (FORMULA III TYPE)

| Hydrosiloxane Fluid | Hydrosiloxane Fluid Structure | Molecular Weight | Viscosity at 25° C. (cstk) | Si—H Content cc $H_2$/gram |
|---|---|---|---|---|
| I | $Me_3SiO(Me_2SiO)_{1.9}(MeSiO)_{1.2}SiMe_3$<br>$\qquad\qquad\qquad\qquad\;\;\mid$<br>$\qquad\qquad\qquad\qquad\; H$ | 375 | 1.86 | 71.70 |
| II | $Me_3SiO(Me_2SiO)_{1.9}(MeSiO)_{1.0}SiMe_3$<br>$\qquad\qquad\qquad\qquad\;\;\mid$<br>$\qquad\qquad\qquad\qquad\; H$ | 363 | 1.81 | 61.70 |
| III | $Me_3SiO(Me_2SiO)_{1.7}(MeSiO)_{1.0}SiMe_3$<br>$\qquad\qquad\qquad\qquad\;\;\mid$<br>$\qquad\qquad\qquad\qquad\; H$ | 348 | 1.70 | 64.40 |
| IV | $Me_3SiO(Me_2SiO)_{1.5}(MeSiO)_{1.0}SiMe_3$<br>$\qquad\qquad\qquad\qquad\;\;\mid$<br>$\qquad\qquad\qquad\qquad\; H$ | 334 | 1.60 | 67.10 |
| V | $Me_3SiO(Me_2SiO)_{2.5}(MeSiO)_{1.5}SiMe_3$<br>$\qquad\qquad\qquad\qquad\;\;\mid$<br>$\qquad\qquad\qquad\qquad\; H$ | 438 | 2.29 | 76.70 |
| VI | $Me_3SiO(Me_2SiO)_{1.5}(MeSiO)_{1.25}SiMe_3$<br>$\qquad\qquad\qquad\qquad\;\;\mid$<br>$\qquad\qquad\qquad\qquad\; H$ | 349 | 1.69 | 80.20 |
| VII | $Me_3SiO(Me_2SiO)_{1.25}(MeSiO)_{1.0}SiMe_3$<br>$\qquad\qquad\qquad\qquad\;\;\mid$<br>$\qquad\qquad\qquad\qquad\; H$ | 315 | 1.55 | 71.10 |
| VIII | $Me_3SiO(Me_2SiO)_{3.0}(MeSiO)_{1.0}SiMe_3$<br>$\qquad\qquad\qquad\qquad\;\;\mid$<br>$\qquad\qquad\qquad\qquad\; H$ | 444 | 3.10 | 50.45 |

TABLE II

ORGANOSILOXANE COPOLYMERS (FORMULA I TYPE)

| Organosiloxane Copolymer | Organosiloxane Copolymer Structure | Molecular Weight | Viscosity at 25° C. (cstk) | D/D' Ratio |
|---|---|---|---|---|
| A | $Me_3SiO(Me_2SiO)_{1.9}(MeSiO)_{1.2}SiMe_3$<br>$\qquad\qquad\qquad\qquad\;\;\mid$<br>$\qquad\qquad\qquad\qquad\; (CH_2)_7CH_3$ | 509 | 4.32 | 1.58 |
| B | $Me_3SiO(Me_2SiO)_{1.9}(MeSiO)_{1.0}SiMe_3$<br>$\qquad\qquad\qquad\qquad\;\;\mid$<br>$\qquad\qquad\qquad\qquad\; (CH_2)_7CH_3$ | 475 | 3.75 | 1.90 |
| C | $Me_3SiO(Me_2SiO)_{1.7}(MeSiO)_{1.0}SiMe_3$<br>$\qquad\qquad\qquad\qquad\;\;\mid$<br>$\qquad\qquad\qquad\qquad\; (CH_2)_7CH_3$ | 461 | 3.99 | 1.70 |
| D | $Me_3SiO(Me_2SiO)_{1.5}(MeSiO)_{1.0}SiMe_3$<br>$\qquad\qquad\qquad\qquad\;\;\mid$<br>$\qquad\qquad\qquad\qquad\; (CH_2)_7CH_3$ | 446 | 3.43 | 1.50 |
| E | $Me_3SiO(Me_2SiO)_{2.5}(MeSiO)_{1.5}SiMe_3$<br>$\qquad\qquad\qquad\qquad\;\;\mid$<br>$\qquad\qquad\qquad\qquad\; (CH_2)_7CH_3$ | 606 | 5.73 | 1.67 |
| F | $Me_3SiO(Me_2SiO)_{1.5}(MeSiO)_{1.25}SiMe_3$<br>$\qquad\qquad\qquad\qquad\;\;\mid$<br>$\qquad\qquad\qquad\qquad\; (CH_2)_7CH_3$ | 489 | 4.54 | 1.20 |
| G | $Me_3SiO(Me_2SiO)_{1.25}(MeSiO)_{1.0}SiMe_3$<br>$\qquad\qquad\qquad\qquad\;\;\mid$<br>$\qquad\qquad\qquad\qquad\; (CH_2)_7CH_3$ | 427 | 3.66 | 1.25 |
| H | $Me_3SiO(Me_2SiO)_{1.9}(MeSiO)_{1.2}SiMe_3$<br>$\qquad\qquad\qquad\qquad\;\;\mid$<br>$\qquad\qquad\qquad\qquad\; (CH_2)_5CH_3$ | 476 | 3.37 | 1.58 |
| I | $Me_3SiO(Me_2SiO)_{1.9}(MeSiO)_{1.0}SiMe_3$<br>$\qquad\qquad\qquad\qquad\;\;\mid$<br>$\qquad\qquad\qquad\qquad\; (CH_2)_5CH_3$ | 447 | 3.21 | 1.90 |

TABLE II-continued

ORGANOSILOXANE COPOLYMERS (FORMULA I TYPE)

| Organosiloxane Copolymer | Organosiloxane Copolymer Structure | Molecular Weight | Viscosity at 25° C. (cstk) | D/D' Ratio |
|---|---|---|---|---|
| J | $Me_3SiO(Me_2SiO)_{1.7}(MeSiO)_{1.0}SiMe_3$ <br> $\mid$ <br> $(CH_2)_5CH_3$ | 433 | 3.30 | 1.70 |
| K | $Me_3SiO(Me_2SiO)_{1.5}(MeSiO)_{1.0}SiMe_3$ <br> $\mid$ <br> $(CH_2)_5CH_3$ | 418 | 2.73 | 1.50 |
| L | $Me_3SiO(Me_2SiO)_{2.5}(MeSiO)_{1.5}SiMe_3$ <br> $\mid$ <br> $(CH_2)_5CH_3$ | 564 | 3.50 | 1.67 |
| M | $Me_3SiO(Me_2SiO)_{1.5}(MeSiO)_{1.25}SiMe_3$ <br> $\mid$ <br> $(CH_2)_5CH_3$ | 454 | 2.65 | 1.20 |
| N | $Me_3SiO(Me_2SiO)_{1.25}(MeSiO)_{1.0}SiMe_3$ <br> $\mid$ <br> $(CH_2)_4CH_3$ | 385 | 2.65 | 1.25 |
| O | $Me_3SiO(Me_2SiO)_{3.0}(MeSiO)_{1.0}SiMe_3$ <br> $\mid$ <br> $(CH_2)_7CH_3$ | 556 | 5.62 | 3.00 |

TABLE III

Hydrosiloxane Fluids (FORMULA IV TYPE)

| Hydrosiloxane Fluid | Hydrosiloxane Fluid Structure | Molecular Weight | Viscosity a 25° C. (cstk) |
|---|---|---|---|
| IX | $HMe_2SiO(Me_2SiO)_2SiMe_2H$ | 282 | 2.40 |
| X | $HMe_2SiO(Me_2SiO)_3SiMe_2H$ | 356 | 2.43 |
| XI | $HMe_2SiO(Me_2SiO)_{4.25}SiMe_2H$ | 449 | 2.60 |
| XII | $HMe_2SiO(Me_2SiO)_5SiMe_2H$ | 505 | 2.89 |

TABLE IV

ORGANOSILOXANE COPOLYMERS (FORMULA II TYPE)

| Organosiloxane Copolymer | Organosiloxane Copolymer Structure | Molecular Weight | % Alkyl Groups | Viscosity a 25° C. (cstk) |
|---|---|---|---|---|
| P | $CH_3(CH_2)_7—Me_2SiO(Me_2SiO)_2SiMe_2—(CH_2)_7CH_3$ | 506 | 44.7 | 4.0 |
| Q | $CH_3(CH_2)_7—Me_2SiO(Me_2SiO)_3SiMe_2—(CH_2)_7CH_3$ | 580 | 39.0 | 5.3 |
| R | $CH_3(CH_2)_7—Me_2SiO(Me_2SiO)_{4.25}SiMe_2—(CH_2)_7CH_3$ | 673 | 33.6 | 14.5 |
| S | $CH_3(CH_2)_7—Me_2SiO(Me_2SiO)_{5.0}SiMe_2—(CH_2)_7CH_3$ | 729 | 31.0 | 14.1 |
| T | $CH_3(CH_2)_4—Me_2SiO(Me_2SiO)_2SiMe_2—(CH_2)_4CH_3$ | 422 | 33.6 | 3.8 |

What is claimed is:

1. An organosiloxane copolymer selected from the group consisting of: (a) an organosiloxane copolymer having the average formula $$Me_3SiO(Me_2SiO)_n(MeSiO)_pSiMe_3 \quad (I)$$
$$\mid$$
$$R$$

wherein: Me is a methyl group, R is an alkyl group having from five to twenty carbon atoms inclusive, n has an average value from one to four inclusive, p has an average value from one to two inclusive, and the ratio of n to p has a value from one to three inclusive; and (b) an organosiloxane copolymer having the average formula $$R'Me_2SiO(Me_2SiO)_nSiMe_2R' \quad (II)$$

wherein: Me is a methyl group, R' is an alkyl group having from five to twenty carbon atoms inclusive, and n has an average value from 0 to 8 inclusive with the proviso that the R' groups represent from 20 to 45 weight percent of the organosiloxane copolymer.

2. An organosiloxane copolymer having the average formula $$Me_3SiO(Me_2SiO)_n(MeSiO)_pSiMe_3$$
$$\mid$$
$$R$$

wherein: Me is a methyl group, R is an alkyl group having from five to twenty carbon atoms inclusive, n has an average value from one to four inclusive, p has an average value from one to two inclusive, and the ratio of n to p has a value from one to three inclusive.

3. An organosiloxane copolymer as claimed in claim 2 wherein R has from five to twelve carbon atoms inclusive.

4. An organosiloxane copolymer having the average formula $$R'Me_2SiO(Me_2SiO)_nSiMe_2R'$$

wherein: Me is a methyl group, R' is an alkyl group having from five to twenty carbon atoms inclusive, and n has an average value from 0 to 8 inclusive with the proviso that the R' groups represent from 20 to 45 weight percent of the organosiloxane copolymer.

5. An organosiloxane copolymer as claimed in claim 4 wherein R' has from five to twelve carbon atoms inclusive.

6. An organosiloxane copolymer as claimed in claim 4 wherein n has an average value of from one to five inclusive.

7. An organosiloxane copolymer as claimed in claim 4 wherein the R' groups represent from 25 to 40 weight percent of the copolymer.

8. An organosiloxane copolymer as claimed in claim 1 wherein R and R' are pentyl.

9. An organosiloxane copolymer as claimed in claim 1 wherein R and R' are hexyl.

10. An organosiloxane copolymer as claimed in claim 1 wherein R and R' are octyl.

11. An organosiloxane copolymer as claimed in claim 1 wherein R and R' are nonyl.

12. An organosiloxane copolymer as claimed in claim 1 wherein R and R' are decyl.

13. A composition consisting essentially of a minor amount of an organosiloxane copolymer as claimed in claim 1 and a major amount of a solvent therefor.

14. A composition as claimed in claim 13 wherein the solvent is selected from the group consisting of polyether triols, diols, and mono-ols such as the adducts of ethylene oxide, propylene oxide, butylene oxide, with starters such as glycerol, water, trimethylolpropane, 1,2,6-hexanetriol, ethylene glycol, butanol, nonylphenol, and the like.

15. A composition as claimed in claim 13 wherein the copolymer is present in the amount of from 1 to 20 weight percent and the solvent is present in the amount of from 80 to 99 weight percent.

16. A process for producing high resilience polyurethane foam having a density of no greater than 2.0 pounds per cubic foot which comprises simultaneously reacting and foaming a reaction mixture containing: (a) an organic polyol selected from the group consisting of (i) a polyether triol containing at least 40 mole percent primary hydroxyl groups and having a molecular weight from about 2,000 to about 8,000 and (ii) a mixture of said polyether triol and other polyethers having an average of at least two hydroxyl groups, said polyether triol of said mixture amounting to at least 40 weight percent of the total polyol content; (b) a polyisocyanate, said organic polyol and said polyisocyanate being present in the mixture in a major amount and in a relative amount required to produce the polyurethane foam; (s) a blowing agent in a minor amount sufficient to foam the reaction mixture; (d) a catalytic amount of catalysts for the production of polyurethane foam; and (e) an organosiloxane copolymer as claimed in claim 1.

17. A process as claimed in claim 16 wherein the foam has a density no greater than 1.75 pounds per cubic foot.

18. A process as claimed in claim 16 wherein the foam has a density no greater than 1.05 pounds per cubic foot.

19. The high resilience polyurethane foam produced by the process as defined in claim 16.

* * * * *